358-86. OR 3,742,131 SR

United States Patent [19]

Rogeness

[11] 3,742,131

[45] June 26, 1973

[54] FREQUENCY INTERFERENCE REDUCTION IN CABLE TELEVISION SYSTEMS

[75] Inventor: Gaylord G. Rogeness, Santa Ana, Calif.

[73] Assignee: Anaconda Wire and Cable Company, New York, N.Y.

[22] Filed: July 2, 1971

[21] Appl. No.: 159,119

[52] U.S. Cl. ............ 178/5.6, 178/DIG. 13, 325/461
[51] Int. Cl. .............................................. H04n 7/10
[58] Field of Search ............................. 178/DIG. 13; 325/461, 308

[56] References Cited

UNITED STATES PATENTS

| | | | |
|---|---|---|---|
| 3,643,164 | 2/1972 | Sly et al. | 325/461 |
| 3,333,198 | 7/1967 | Mandell et al. | 325/461 |

*Primary Examiner*—Richard Murray
*Attorney*—White, Haefliger & Bachand

[57] ABSTRACT

A cable television system includes:

a. head end means for receiving multiple channel programming with standard 1.5 MHz spread between adjacent channel picture and sound carriers, and for shifting said bands to provide greater than 1.5 MHz spread therebetween on the distribution cable, b. a converter having an input from the cable and an output operatively connectible with the television receiver, the frequency spread between adjacent channel picture and sound carriers at said input being substantially greater than 1.5 MHz, and c. the converter including circuit means for selecting a desired channel on the cable and converting the frequencies associated with that channel to a predetermined output frequency band.

10 Claims, 10 Drawing Figures

T5002

INVENTOR.
GAYLORD G. ROGENESS
BY White, Haefliger & Bachand
ATTORNEYS.

INVENTOR.
GAYLORD G. ROGENESS
BY
White, Haefliger & Bachand
ATTORNEYS.

FREQUENCY INTERFERENCE REDUCTION IN CABLE TELEVISION SYSTEMS

BACKGROUND OF THE INVENTION

This invention relates generally to cable television systems, and more particularly concerns the allocation of channel frequencies to minimize adjacent channel sound carrier frequency interference in user receivers; also, there is provision for multiple channel conversion of cable frequencies to be compatible with a TV receiver.

In standard VHF cable television systems, each channel is assigned a frequency band 6.0 MHz wide, with a 1.5 MHz wide interval separating adjacent channel sound carrier from video carrier. The latter are designated by the frequency symbols $f_s$ and $f_p$, since the upper portion of the band is used to transmit sound information, whereas the lower portion of the band transmits video picture information. Accordingly, the 1.5 MHz interval separates $f_s$ for channel X from $f_p$ for Channel X + 1.

It is often found that, due to any one or the combination of problems that may arise, there is interference between $f_s$ for, say channel X, and $f_p$ for the next channel X + 1. Therefore, problems exist as to interference between $f_s$ of Channel X − 1 with $f_p$ of channel X, and $f_p$ of channel X + 1 with $f_s$ of channel X. Such interference of transmitted sound information for one channel with transmitted picture information for the next higher channel produces unwanted interference lines on the screen of a subscriber's TV receiver.

Another source of unwanted interference between adjacent channel frequencies, particularly in color information transmission, lies in the production of third order distortion products such as "triple beats", and third order intermodulation arising from cable system transmitted component frequency interaction. The number and amplitude of such beats increases with the number of channels being handled by a cable transmission system. (See proceedings of IEEE, Vol. 58, No. 7, July 1970, pp. 1071–1085).

An important cause of the above difficulties is due to the fact that TV receiver manufacturers have designed such equipment in accordance with FCC broadcast frequency assignments such that only alternate channels are transmitted in a given area, off the air. Accordingly, the amount and quality of adjacent channel trapping in such equipment was minimized; however, when cable systems introduce transmission of all VHF channels (2–13), instead of only alternate channels, conventional TV receivers became inadequate as respects adjacent channel trapping requirements imposed by adjacent channel transmission. Simply put, conventional TV receivers are incompatible with multiple channel cable television systems.

SUMMARY OF THE INVENTION

It is a major object of the invention to provide a solution to the above interference problems. Basically, the solution is realized through the provision of cable television equipment for producing and handling adjacent channels the spread between which differs from conventional allocations. As will appear, head-end means in the system receives multiple channel programming with standard 1.5 MHz spread between certain adjacent channel carriers, and separates the 6.0 MHz bands to provide for greater than 1.5 MHz spread between adjacent channel carriers. The latter bands are transmitted on the cable and received by a converter associated with a subscriber's receiver, the converter including circuit means for selecting a desired channel on the cable and converting the shifted frequencies associated with that channel to a predetermined output frequency band for display on the subscriber's receiver screen. As will be seen, the converter is tunable, so that the subscriber has available cable transmitted channel programming.

More specifically, operation of the head-end equipment typically may be characterized by frequency conversion, wherein upper and lower carrier frequencies $f_s$ and $f_p$ (sound and picture, respectively) are inverted from the condition $f_p < f_s$ to the condition $f_s < f_p$; further, this relationship may again be inverted at the converter, as by operation of a mixer, so that $f_p < h_s$ at the converter output, only one mixer being required. If the initial inversion were not present, two mixer stages may be used in the converter at the subscriber equipment.

Further, the third order distortion problem may be reduced through the provision of head-end means producing groups of channel programming, the spacing of $f_p$ frequencies for adjacent channels in any one group differing somewhat from the spacing of $f_p$ frequencies for adjacent channels in another group or groups.

These and other objects and advantages of the invention, as well as the details of illustrative embodiments, will be more fully understood from the following description and drawings, in which:

DRAWING DESCRIPTION

DETAILED DESCRIPTION

Figure 1:
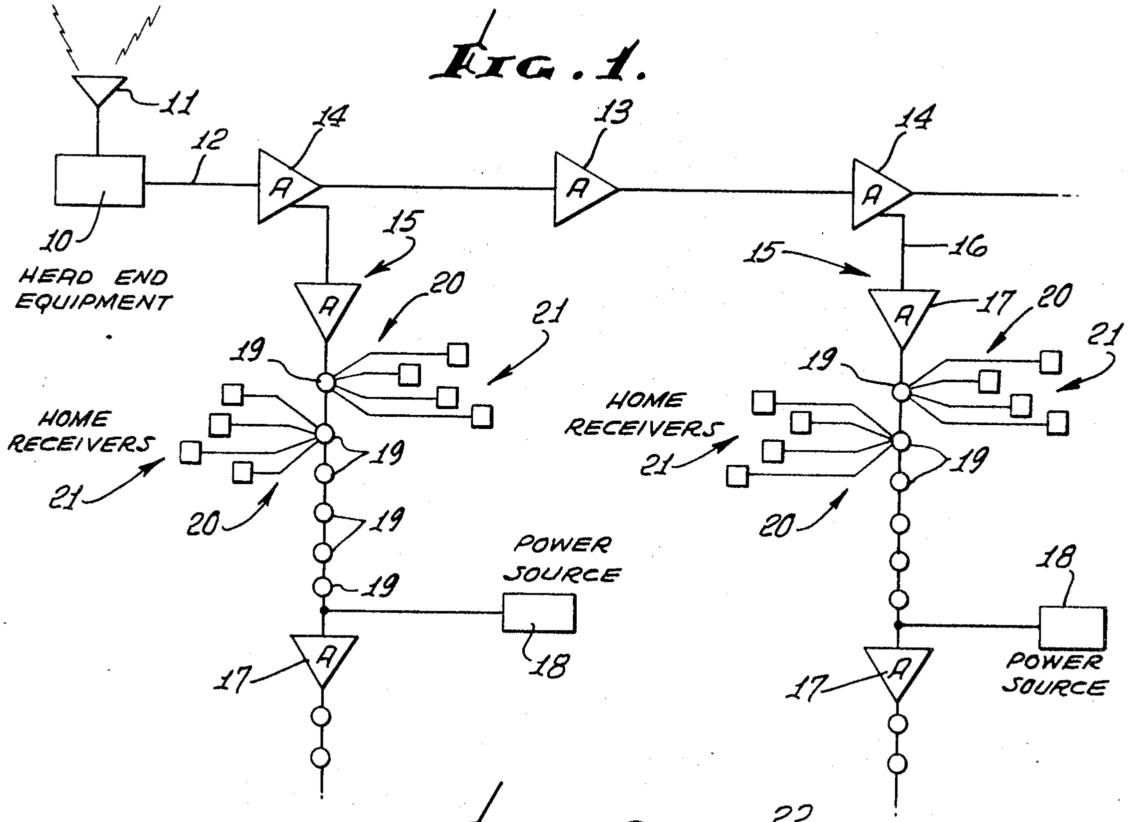
FIG. 1 is a block diagram of a cable television system.

Referring first to FIG. 1, the illustrated cable television system includes head end equipment 10 with antenna 11 to pick up broadcast multi-channel television signals. Such equipment is known and is operable to correct and adjust the signal level for each channel, with separate correction for picture and sound carriers. Such equipment also typically includes preamplifiers, demodulators, modulators for each channel, together with a multi-channel combining network, the output of which is applied to the cable system.

To the right of the equipment 10 is shown a main trunk line which is the major link from the head end 10 to the community. It consists of coaxial cable 12 with repeater or main trunk amplifiers 13 connected in series with and spaced along the cable. AGC amplifiers may also be connected in series with the cable to provide automatic correction for changes in signal level. The main trunk line also includes bridging amplifiers 14, each having several outputs and enough gain to make up for isolation loss and power loss inherent in multiple outputs. From the bridging amplifiers feeder lines 15 are run along a row of subscribers' houses. The feeder lines include coaxial cable 16 and line extender amplifiers 17 operable to compensate for the loss in the feeder system. As an example, each feeder line may include four to 10 or more line extender amplifiers. Power to the cables is supplied at permissible levels as by the transformers or other sources 18. Between successive amplifiers 17 directional taps or couplers 19 are provided, typically with multiple outputs 20 to which individual home receivers 21 are connected, such taps being known devices. For example, a four house tap is typically used every 150 feet.

Figure 2:
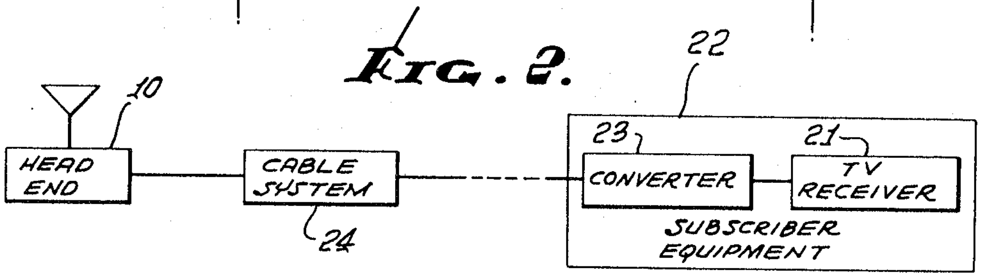
FIG. 2 is a block diagram of converter locations in such a system.
Figure 5:
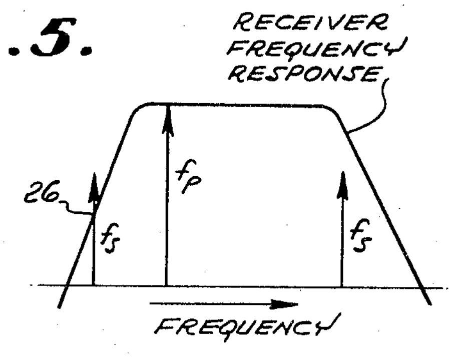
FIGS. 4–6 are frequency distribution diagrams.
Figure 4:
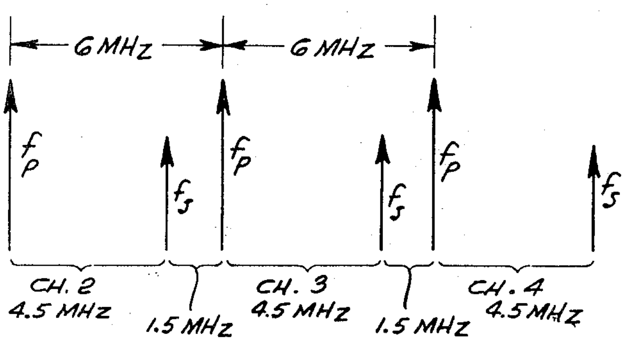

In FIG. 2, the head-end equipment 10 is operable to receive multiple channel programming with standard 1.5 MHz spread between adjacent channel picture and sound carriers (as seen in FIG. 4), and to shift the bands to provide greater than 1.5 MHz spread between such carriers. Each band is characterized by upper and lower carrier frequencies $f_s$ and $f_p$, $f_s$ exceeding $f_p$ at the input to the head-end means, and $f_p$ exceeding $f_s$ at the output of the head-end means in one environment. In this regard, $f_s$ is associated with sound information, whereas $f_p$ is associated with picture information. Reference is made to FIGS. 4 and 5 in which the upper and lower frequencies $f_s$ and $f_p$ for each of channels 2 and 3 are depicted, with a standard spread of 1.5 MHz between $f_s$ for channel 2 and $f_p$ for channel 3. (FIG. 5 shows interference at 26 of $f_s$ with the next higher channel band pass output of a typical TV receiver fed from a cable system with conventional frequency spacing, the lower end of that output overlapping $f_s$, to allow inadequately filtered $f_s$ to generate interference).

Figure 6:
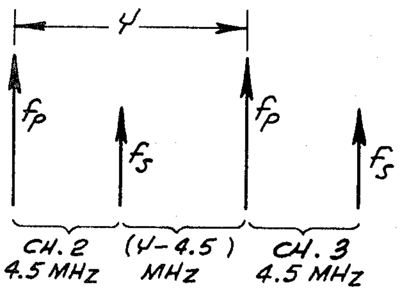

In FIG. 6 the frequency spread between adjacent carriers has been increased by the head end means to a value Y − 4.5, where Y is the frequency spread between $f_p$ values for adjacent channels in a given channel grouping. For example, if Y is converted to 8.5 MHz, then the spread between $f_s$ for a given channel and $f_p$ of the next higher channel is 8.5 − 4.5, or 4.0 MHz, which is sufficient for substantial reduction of most adjacent channel interference problems as referred to.

Merely as representative, $f_s$ and $f_p$ values for channels 2–5 are as follows:

| Channel | $f_s$ (MHz) | $f_p$ (MHz) | Channel Bandwidth |
|---|---|---|---|
| 2 | 124.75 | 129.25 | 124.5 – 130.5 |
| 3 | 133.25 | 137.75 | 133.0 – 139.0 |
| 4 | 141.75 | 146.25 | 141.5 – 147.5 |
| 5 | 150.25 | 154.75 | 150.0 – 156.0 |

Also in FIG. 2 the subscriber's equipment 22 is shown as including a converter 23 connected in series between the cable system (generally designated at 24) and the receiver 21. It is the function of the converter to select a desired channel on the cable and to convert the frequencies associated with that channel to a predetermined output frequency band compatible with that receiver.

Figure 3:
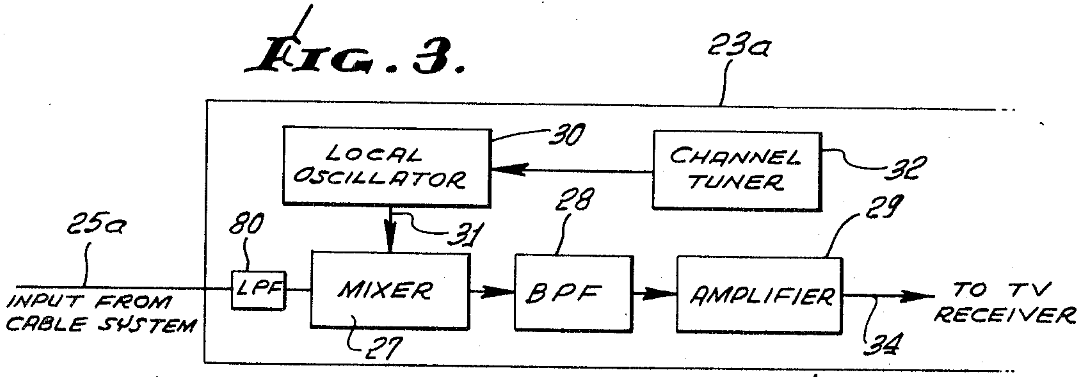
FIG. 3 is a block diagram of the FIG. 2 convertion.

Referring to FIG. 3, the converter **23*a* which may correspond to the converter 23 in FIG. 2, includes in sequence a mixer 27, band pass filter 28 and amplifier 29. The output 31 of a local oscillator 30 is fed to mixer 27 for mixing with the input 25*a* from the cable system, and a channel tuner 32 is manually operable to adjust the output of the local oscillator 30, (yielding a conventional receiver channel frequency, such as 12 or 13), whereby tuning is accomplished at the converter. Because of this increase in spacing between channels a less compact and expensive BPF 28 can be used and is usable to reduce adjacent channel carrier level. Amplifier 29 can employ frequency selective circuits to reduce adjacent channel frequency level. Low pass filter 80** is connected as shown to block undesired frequencies.

Figure 8A:
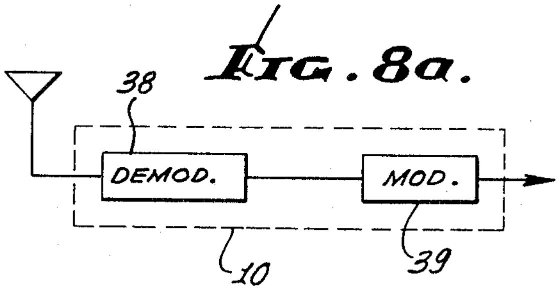
FIGS. 8a–8c are block diagrams of head end configurations.
Figure 8B:
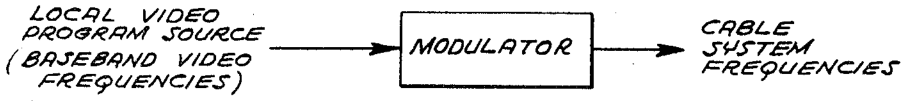
Figure 8C:
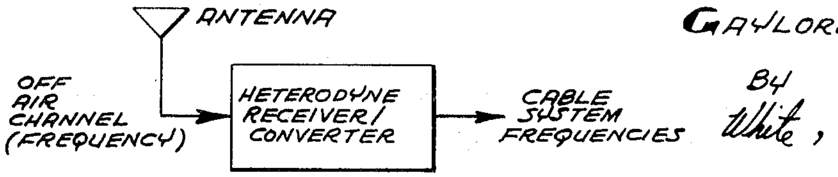

It should be noted that the mixer 27 inverts channel frequencies, so that the input **25*a* to the mixer must itself have been inverted in order that the output 34 to the TV receiver have $f_s$ higher in frequency than $f_p$, for compatibility with the selected channel circuitry in the standard television receiver. In this regard, advantage is taken of the fact that the head-end means 10 has inverted the channel frequencies. The head-end equipment seen in FIG. 8 serves this function, and may include a demodulator 38 (for example Conrac Model AV–12) and a modulator 39 (Anaconda Electronics Model 8900, for example), connected as shown. FIGS. 8*b* and 8*c*** show alternate forms of head-end equipment accomplishing these functions.

Figure 7:
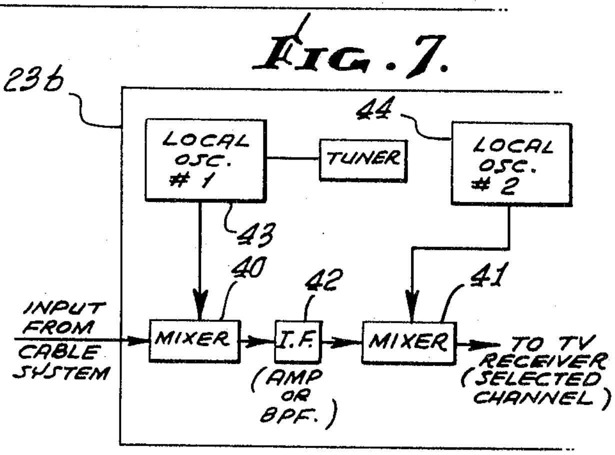
FIG. 7 is a block diagram of a modified convertion to be used in a cable television system.

Another type converter as shown at **23*b* in FIG. 7 employs a pair of mixers 40 and 41 interconnected as shown, as via intermediate frequency amplifier (or band pass filter) 42. Local oscillators 43 and 44, either or both of which is tunable, have outputs connected with the mixer inputs. Inasmuch as mixer 40 inverts the channel frequencies, and mixer 41** inverts the inverted frequencies, no inversion equipment is necessary at the head end.

Finally the previously mentioned third order distortion problems may be overcome by head-end equipment conversion of the incoming channels on the cable into multiple groups, with adjacent channel spacing in one group differing from adjacent channel spacing in other groups. For example, in the following table, Group I channels have $f_p$ spacing of 8.5 MHz, whereas Group II channels have $f_p$ spacing of 8.3 MHz.

GROUP I

| Ch. No. | MHz $f_s$ | MHz $f_p$ | MHz to MHz Ch. - Bandwidth | Air Ch. |
|---|---|---|---|---|
| 1 | 116.25 | 120.75 | 116.0 – 122.0 | 5 |
| 2 | 124.75 | 129.25 | 124.5 – 130.5 | 7 |
| 3 | 133.25 | 137.75 | 133.0 – 139.0 | 9 |
| 4 | 141.75 | 146.25 | 141.5 – 147.5 | 13 |
| 5 | 150.25 | 154.75 | 150.0 – 156.0 | 42 |
| 6 | 158.75 | 163.25 | 158.5 – 164.5 | Local |
| 19 | 167.25 | 171.75 | 167.0 – 173.0 | 32 |
| 20 | 175.75 | 180.25 | 175.5 – 181.5 | 24 |
| 7 | 184.25 | 188.75 | 184.0 – 190.0 | 2 |
| 8 | 191.75 | 197.25 | 192.5 – 198.5 | 6 |

GROUP II

| Ch. No. | MHz $f_s$ | MHz $f_p$ | MHz to MHz Ch. - Bandwidth | Air Ch. |
|---|---|---|---|---|
| 9 | 212.25 | 216.75 | 212.0 – 218.0 | 4 |
| 10 | 220.55 | 225.05 | 220.30 – 226.30 | 8 |
| 11 | 228.85 | 233.35 | 228.60 – 234.60 | 50 |
| 12 | 237.15 | 241.65 | 236.90 – 242.90 | 3 |
| 13 | 245.45 | 249.95 | 245.20 – 251.20 | 10 |
| 14 | 253.75 | 258.25 | 255.30 – 259.50 | Local |
| 15 | 262.05 | 266.55 | 263.60 – 267.80 | 64 |
| 16 | 270.35 | 274.85 | 271.90 – 276.10 | 11 |
| 17 | 278.75 | 283.15 | 280.20 – 284.40 | Local |
| 18 | 286.95 | 291.45 | 288.50 – 292.70 | Local |

The invention realizes a further advantage in that TV channel information is not only frequency inverted, but is also relocated with reference to off-air signals which tend to leak into the distribution system in a high signal ambient area and otherwise causing interference or degradation of picture quality.

I claim:

1. In a cable television system including an input cable on which multiple channel programming is transmitted, the improvement comprising:

a. a converter having an input from the cable and an output operatively connectible with the television receiver, the frequency spread between adjacent channel picture and sound carriers at said input being substantially greater than 1.5 MHz, and b. the converter including circuit means for selecting a desired channel on the cable and converting the frequencies associated with that channel to a predetermined output frequency band, and c. said system having head end means for receiving multiple channel programming with standard 1.5 MHz spread between adjacent channel picture and sound carriers, and for producing said multiple channel programming on the input a cable and characterized by multiple groups of channels each having a carrier frequency $f_p$ associated with picture information with the spacing of $f_p$ frequencies for adjacent channels in one group differing from the spacing of $f_p$ frequencies for adjacent channels in another group.

2. The improvement of claim 1 wherein each said channel is characterized by upper and lower carrier frequencies $f_s$ and $f_p$, $f_p$ associated with picture information and $f_s$ associated with sound information, $f_s$ exceeding $f_p$ at the input to said head end means, and $f_p$ exceeding $f_s$ at the output of said head end means.

3. The improvement of claim 2 wherein said converter includes a tunable local oscillator having an output, and a mixer receiving the oscillator output and the input from the cable, said mixer characterized as operating to invert the carrier frequencies so that $f_s$ exceeds $f_p$ in said predetermined output frequency band, to be compatible with the receiver.

4. The improvement of claim 2 wherein the spacing of $f_p$ frequencies for adjacent channels at the converter input is within the range that includes 8.3 to 8.5 MHz.

5. The improvement of claim 1 wherein said converter includes a tunable local oscillator having an output, a mixer receiving the oscillator output and the input from the cable, and band pass filter means receiving the output from the mixer.

6. The improvement of claim 5 wherein said converter includes a second tunable oscillator having an output, and a second mixer receiving the second oscillator output and a version of the first mixer output.

7. The improvement of claim 1 wherein there are two of said multiple groups, each group having approximately the same number of channels as the other group.

8. In the method of operating a cable television system that includes head end and distribution means operable to transmit multiple channel programming on a cable for reception by a television receiver, the steps that include a. receiving at the head end means multiple channel programming with standard 1.5 MHz spread between adjacent channel picture and sound carriers, and b. shifting said carriers, at the head end means, to provide greater than 1.5 MHz spread therebetween and to produce said multiple channel programming on the cable and characterized by multiple groups of channels each having a carrier frequency $f_p$ associated with picture information with the spacing of $f_p$ frequencies for adjacent channels in one group differing from the spacing of $f_p$ frequencies for adjacent channels in another group.

9. The method of claim 8 including the step of converting, proximate the receiver, the frequencies associated with a selected channel to a predetermined output frequency band.

10. The method of claim 9 wherein said shifting inverts the picture and sound carrier frequencies, and said converting re-inverts the picture and sound carrier frequencies.

* * * * *